United States Patent Office 3,282,824
Patented Nov. 1, 1966

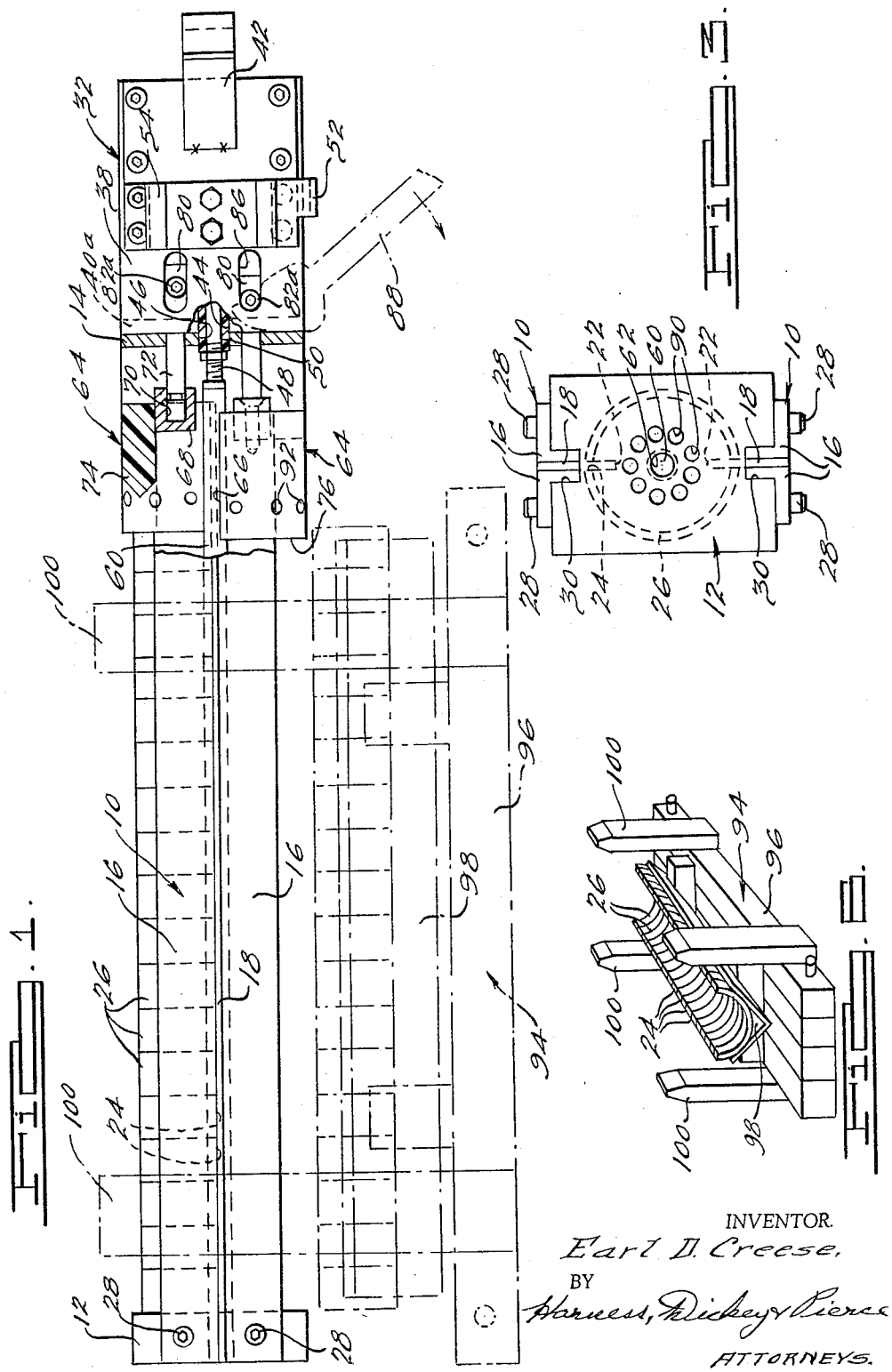

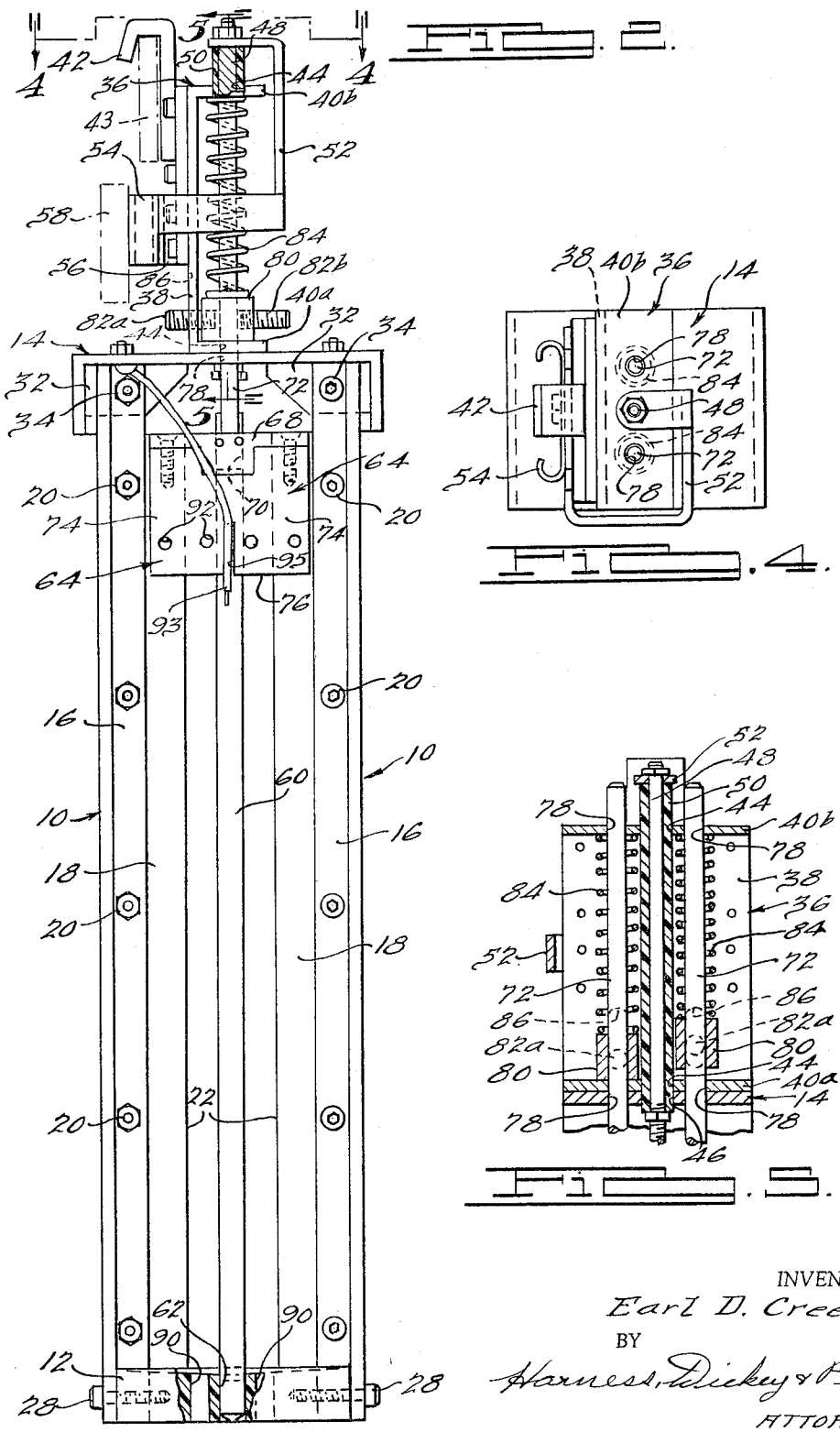

3,282,824
DUAL SIDED PLATING RACK
Earl D. Creese, St. Johns, Mich., assignor to Federal-Mogul-Bower Bearings, Inc., Detroit, Mich., a corporation of Michigan
Filed Dec. 17, 1962, Ser. No. 245,028
7 Claims. (Cl. 204—297)

The present invention broadly relates to electroplating apparatus and more particularly to an improved high capacity electroplating rack which can be simply and quickly loaded with two columns of semi-cylindrical workpieces such as shell-type half bearings, for example, so as to enable the electroplating or other electrochemical treatment of the inner concave surfaces thereof.

While the plating rack comprising the present invention can be satisfactorily employed for the electroplating or electro-chemical treatment of the inner circumferential surfaces of any one of a variety of semi-circular articles, it is particularly applicable for the electroplating of the concave surfaces of shell-type half bearings. It is common practice in the manufacture of precision shell-type half bearings of the type used in automotive engines and the like to improve the bearing surface thereof by applying a thin uniform bearing metal "overplate" on the bearing lining. Conventionally, the bearing lining may comprise a suitable bearing alloy such as a copper-lead alloy or an aluminum-tin alloy, for example, which is tenaciously bonded to an underlying hard metal backing member such as steel, for example. It is important that the overplate applied to the surface of the bearing lining be of a controlled and uniform thickness obviating the necessity of subjecting such overplated bearings to subsequent machining operations. The electroplating rack comprising the present invention can also be satisfactorily employed for applying substantially thicker coatings of suitable bearing metals and alloys directly to a hard metal backing member or over a suitable bearing lining substance after which, if desired, the bearing surface can be machined to obtain the requisite accuracy of the bearing surface contour.

Modern automated manufacturing processes employed in the manufacture of such shell-type half bearings, has created a materials handling problem in connection with the handling, transporting and storing of the bearing halves during and between successive machining and forming operations. In most instances, it has been found that greater efficiency is achieved by handling the partially or completely machined bearing halves in stacked rows or columns facilitating the handling thereof by automatic feeding and conveying mechanisms. A continuing problem, however, has been presented in providing a plating rack design which is readily adaptable for rapid and simple loading and unloading of such shell-type half bearings in the form of stacked rows or columns without necessitating an excessive amount of manual manipulation of the individual bearing halves.

A variety of electroplating racks have heretofore been used or proposed for use which are designed so as to provide for the electroplating of the inner circumferential or concave surfaces of such bearing halves. In most instances, however, racks of this type have necessitated lengthy and tedious loading and unloading operations detracting from the overall efficiency of the manufacturing process. In addition some of the plating rack constructions heretofore known have occasioned a substantial entrapment of the treating solutions in which the racks are successively immersed causing an excessive degree of solution "drag-out" and "drag-in" between successive treating tanks resulting in the depletion and contamination of the relatively expensive treating solutions. The depletion and contamination of such treating solutions has also occasioned an impairment of the quality of the resultant coating deposited. The complex structure and the shielding arrangement incorporated in such plating racks heretofore known has also inhibited the free circulation and uniform contact of the treating solutions with the surfaces of the workpieces which have also contributed toward a reduction in the quality of the resultant coating deposited.

It is accordingly, a primary object of the present invention to provide an improved plating rack construction which overcomes the disadvantages and problems associated with plating racks for semicylindrical workpieces of the types heretofore known.

Another object of the present invention is to provide an improved plating rack design which provides for a substantial simplification in materials handling problems and facilitates the loading and unloading of a plurality of semi-cylindrical shell-type articles in the form of stacked columns or rows consistent with the form in which such articles are conventionally transported in automatic machinery and material handling equipment.

Still another object of the present invention is to provide an improved plating rack design which is of a light weight, compact and open construction and has a workpiece capacity substantially greater than work racks of comparable size and weight heretofore known.

A further object of the present invention is to provide an improved plating rack design which minimizes treating solution drag-out and drag-in problems and enhances the circulation and contact of the treating solutions with the concave surfaces of the semi-cylindrical articles mounted thereon while concurrently shelding the exterior surfaces from electrochemical reaction or deposits.

A further object of the present invention is to provide an improved plating rack which is of simple and compact design, of a durable and sturdy construction, and of economical manufacture and use.

The foregoing and other objects and advantages of the present invention are achieved by a plating rack construction comprising a framework including a pair of elongated side members disposed in spaced relationship and a pair of spaced end members connected thereto. Each of the side members include a longitudnally extending web of a non-conductive material which extends between the end members and is disposed in diametrically opposed relationship to the web on the opposite side member and with the opposing edges thereof positioned in spaced substantially parallel relationship. An electrode extends longitudinally between the end members and centrally between the opposing edges of the webs and is adapted to be electrically connected to a suitable contact brush mounted on one of the end members which is disposed in electrical contact with a bus bar located adjacent to a station at which an electroplating operation is to be performed. A pair of clamping shoes are mounted on one of the end members to each side of the plane of the webs and are biased toward the opposite end member for removably clamping a stacked column of semi-circular cylindrical articles disposed in side-edge to side-edge abutting relationship with the parting edges thereof disposed in bearing contact against the surfaces of the webs and with the concave surfaces thereof disposed substantially concentrically around the central electrode. A carrier hook is mounted on one of the end members for suspending the work rack from a suitable electrified supporting rail and includes conductor means for electrifying each of the stacked columns of semi-cylindrical workpieces with a charge opposite to that of the central electrode. Coacting means are provided on each of the clamping shoes for retracting them to a loading position wherein the rack can be conveniently placed over a loading fixture containing a stacked row of semi-cylindrical workpieces and thereafter can be released effecting a clamping of the workpieces in appropriate aligned position on the rack.

Other objects and advantages of the present invention will become apparent from the following detailed description taken in conjunction with the accompanying drawings, wherein:

FIGURE 1 is a side elevation view partly in section of a plating rack incorporating therein the preferred embodiments of the present invention and further illustrating a typical loading fixture shown in phantom;

FIG. 2 is a side elevation view of the plating rack as viewed in a direction disposed 90° from the view illustrated in FIGURE 1 and showing the rack in a typical plating position suspended from a suitable supporting rail;

FIG. 3 is a plan view of the base of the plating rack shown in FIGURE 1;

FIG. 4 is a plan view of the hook end portion of the plating rack shown in FIGURE 2;

FIG. 5 is a transverse sectional view of the upper end portion of the plating rack shown in FIGURE 2 and taken along the line 5—5 thereof; and FIG. 6 is a perspective view of a loading fixture including a stacked row of semi-cylindrical workpieces preparatory to loading thereof in the work rack.

Referring now in detail to the drawings, a plating rack constructed in accordance with the preferred embodiments of the present invention comprises a framework including a pair of elongated side members 10 which are fastened at one of the ends thereof to a base or end member 12 and at the opposite ends thereof to a top or end member 14. Each of the side members 10 comprise a pair of angle iron shaped reinforcing stringers 16 which are positioned with one of their flange surfaces in overlying clamping relationship against a longitudinally extending insulating web 18 disposed therebetween. The insulating web 18 is of a nonconductive material and is securely clamped between the stringers 16 by means of a plurality of clamping screws 20 disposed in longitudinally spaced intervals along the mating flanges of the stringers 16.

The insulating web 18 of each of the side members 10 extends for substantially the entire length of the side members from a point contiguous to the inner surface of the base member 12 to a point adjacent to the inner surface of the top member 14. The insulating webs project inwardly of and beyond the flanges of the stringers 16 and are disposed in substantially diametrically opposed relationship. The opposing edges 22 of each of the webs 18 are disposed in spaced substantially parallel relationship and define in combination with the inwardly projecting faces of the insulating webs non-conductive supporting surfaces against which the parting edges 24 of suitable semi-cylindrical articles such as the shell-type half bearings 26 as shown in phantom in FIGURE 1 are adapted to be positioned in bearing contact.

The ends of the side members 10 are securely fastened to the base member 12 by suitable fastening means such as screws 28 which are threadably engaged in the base member. The base member 12 is preferably provided with a suitable groove or slot 30 in opposite edges thereof as may be best seen in FIGURE 3 for slidably receiving the inwardly extending flanges of the angle iron stringers 16.

As may be best seen in FIGURES 2 and 4 the top member 14 is of a general U-shaped configuration and is provided with a pair of opposed reinforcing webs or gussets 32 which are rigidly affixed to the inner surface thereof and are of a thickness corresponding substantially to the thickness of the insulating web 18. Accordingly, the upper end of each of the side members 10 as viewed in FIGURE 2 is adapted to slidably overlie the gusset 32 and is securely clamped thereto by suitable fastening means such as bolts 34.

A U-shaped bracket 36 comprising a web member 38 and a pair of side flanges 40a, 40b integrally secured to the parallel side edges of the web member 38 is securely fastened at the side flange 40a thereof to the upper surface of the top member 14. A hook member 42 is securely fastened to the web member 38 for suspending the plating rack from a suitable supporting fixture such as a conveyor rail 43 as shown in phantom in FIGURE 2 during an electroplating operation.

The side flanges 40a, 40b are formed with a pair of bores 44 disposed centrally and in axial alignment with a bore 46 through the center of the top member 14 through which a contact rod 48 enclosed within an insulating sleeve 50 extends. The upper end of the contact rod as viewed in FIGURES 2 and 5 is securely fastened in electrical contact to a conductor 52 which is disposed in electrical contact with a wiper contact or brush 54 that is mounted by means of an insulating block 56 to the web member 38. The wiper contact 54 is adapted to be positioned in sliding electrical contact with a suitable power source such as a contact rail 58 as shown in phantom in FIGURE 2 at those stations at which an electrochemical or electroplating operation is to be performed. The opposite end of the contact rod 48 is adapted to be electrically connected to a replaceable central anode or electrode 60 which extends longitudinally and centrally between the opposing edges 22 of the insulating web 18 and has its lower end as viewed in FIGURE 2 slidably engaged in a bore 62 through the center of the base member 12.

The semi-circular articles such as the shell-type half bearings 26 when loaded on the work rack are disposed in the form of a stacked row or column with the side edges thereof in abutting relationship and the parting edges 24 thereof in firm bearing contact against the surfaces of the insulating webs 18. The inner cylindrical or concave surfaces of the bearings are disposed substantially concentrically with respect to the periphery of the central electrode 60 whereby the current density and the metal deposited from the electrode or anode 60 on the concave surfaces is substantially uniform across the entire concave surface. The stacked columns or rows of bearings are maintained in the appropriate aligned position on the plating rack by means of a pair of clamping shoes 64 which are resiliently biased and axially movable relative to the top member 14. The clamping shoes 64 are positioned with their side edges 66 disposed in sliding contact along the aligned planar faces of the insulating webs 18.

Each of the clamping shoes 64 as best shown in FIGURES 1 and 2 comprise a metallic T-shaped bracket 68 which is formed with a socket 70 therein in which the end of a push rod 72 is adapted to be removably secured. The bracket 68 is securely fastened to a semi-circular insulator block 74 having the forwardly directed surface 76 thereof adapted to be disposed in bearing contact against the side edge of the uppermost or right-hand semi-circular article as viewed in FIGURE 1.

The push rod 72 of each of the clamping shoes 64 is disposed in sliding contact in bores 78 extending in axial alignment through the top member 14, and the flanges 40a, 40b of the U-shaped bracket 36. Suitable stop means such as a collar 80 is clamped around each of the push rods 72 and is secured thereto by a pair of set screws 82a, 82b. The collar 80 is adapted to coact with the inner surface of the flange 40a of the U-shaped bracket 36 restricting longitudinal axial movement of the push rod 72 downwardly as viewed in FIGURE 2. A coil spring 84 is disposed around each of the push rods 72 and is disposed with one of its ends in bearing contact against the collar 80 and the other of its ends against the inner face of the flange 40b. The set screws 82a projects through a suitable elongated slot 86 through the web member 38 of the U-shaped bracket 36 and is adapted to be engaged by a suitable key or wrench 88 as shown in phantom in FIGURE 1 for retracting the clamping shoe 64 from the fully projected position as shown in FIGURE 2 to a retracted position longitudinally spaced therefrom in opposition to the axial biasing force of the coil spring 84.

The preferred configuration of the wrench 88 is such that upon retraction of the clamping shoe to a retracted position, the clamping shoe remains in that position until the wrench is released enabling the resilient biasing force of the coil spring 84 to move the shoe to a clamping position in engagement with a stacked column of half round bearings as shown in FIGURE 1 which is spaced intermediate the fully projected and fully retracted positions. The resilient biasing force of the coil spring 84 maintains the stacked column of shell type half bearings 26 in firm mutual side edge abutting relationship and against the insulating webs 18 until the clamping shoe is again released at the completion of the processing operation.

The mutual side-edge to side-edge abutting relationship of the stacked column of half round bearings 26 serves to provide a shield around the central electrode 60 which provides for only a negligible degree of electro-deposition of the metal onto the backs of the bearings during an electroplating operation. This shielding action also prevents any significant electro-deposition of metal on the side edges and parting edges of the shell type half bearings 26 which is undesirable.

In order to facilitate the free circulation of the electrolyte and other treating solutions adjacent to the concave surfaces of the semi-cylindrical articles, the bottom member 12 is provided with a plurality of apertures or ports 90 through which the solutions pass on immersion and withdrawal of the work rack from a treating receptacle. The insulator block 74 of the clamping shoes 64 is also provided with a plurality of drain ports 92 through which the treating solutions pass when the rack is immersed in a treating receptacle. To facilitate rapid drainage and to minimize the entrapment of any treating solution in the plating rack on withdrawal thereof from a treating receptacle, the inner surface of the base member 12 is formed with a generally concave or dished configuration as shown in FIGURE 2 facilitating drainage of the solution out through the ports 90.

Further improvements in the drainage characteristics of the rack are achieved by mounting the hook 42 in a position laterally spaced from the center of gravity of the rack whereupon on withdrawal of the rack from a treating receptacle the rack assumes a position with its longitudinal axis angularly inclined relative to the vertical. This inclination of the rack also serves to minimize the detrimental effects to the treated surfaces as a result of the cascading of the treating solution downwardly across the surfaces of the workpieces during its withdrawal from a treating receptacle. The lateral offset of the hook 42 relative to the center of gravity of the work rack also provides a turning couple which urges the contact brush 54 toward a firm electrical contact with the contact rail 58 while the rack is immersed and the workpieces thereon are undergoing an electroplating operation.

The base member 12, the insulating webs 18, the insulating sleeve 50 around the contact rod 48, the insulating block 56 under the wiper contact 54, as well as the insulator block 74 of the clamping shoe 64 are all comprised of a suitable non-conductive material which is of adequate structural strength and is resistant to chemical attack by the hot and cold acidic and alkaline solutions in which the plating rack is immersed. Materials suitable for this purpose include synthetic plastics such as, for example, polyvinyl chloride, polyvinylidene chloride, co-polymers of polyvinyl and polyvinylidene chloride, phenolaldehyde, polymethyl methacrylate, and the like. The metallic components of the rack framework such as the angle iron stringers 16 which are immersed directly in the treating solution may also be provided with a suitable non-conductive protective coating such as a vinyl plastisol coating to prevent corrosive attack thereof and the deposition of a metallic plating thereon.

The plating rack as shown is adapted to be immersed in the treating solutions to a depth whereby the liquid level in the treating receptacle is positioned above the drain ports 92 in the insulator blocks 74 of the clamping shoes 64 and below the bracket 68. Accordingly, the upper portions of the plating rack are not exposed to corrosive attack by the treating solution and are not susceptible to the electro-deposition of the metal being plated. As hereinafter set forth, the central electrode or anode 60 is electrified through the contact rod 48, conductor 52, and contact brush 54 disposed in electrical contact with a contact rail 58. The foregoing components are all insulated from the framework of the electroplating rack which is charged with a polarity opposite to that of the electrode 60 through the contact between the carrier hook 42 and the electrified supporting rail 43. Electrification of each of the stacked column of bearings is achieved by a pair of conductors 93, as shown in FIGURE 2 which are mounted in electrical contact on the top member 14 and are adapted to have the opposite ends thereof disposed in electrical contact with the uppermost of the articles in each column. The insulator blocks 74 are preferably provided with longitudinal slots 95 in which the lower portion of the conductors 93 are retained.

The compact and light-weight construction of the plating rack as herein shown and described facilitates the handling and loading and unloading of semi-cylindrical workpieces in the form of stacked rows and columns. The loading and unloading of each side of the work rack is facilitated by the use of a suitable loading fixture 94 as shown in FIGURE 6 comprising a base 96 provided with a longitudinally extending V-shaped trough 98 on which an aligned row of semi-cylindrical shell-type half bearings 26 are placed preparatory to loading on the plating rack. The base 96 of the loading fixture is provided with four upstanding alignment pins 100 which are adapted to slidably and guidably engage the exterior faces of the side members 10 as the work rack is lowered in position over the stacked column of bearings. Before the rack is lowered, the clamping shoe 64 on one side of the rack is retracted to the loading position by the wrench 88 after which the rack is lowered over the stacked column of bearings until the parting edges 24 thereof are disposed in firm abutting relationship against the insulating webs 18. The wrench 88 thereafter is released enabling the clamping shoe 64 to engage and clamp the stacked column of bearings between the inner surface of the base member 12 and the forwardly directed edge 76 of the insulator block 74. The opposite side of the plating rack can be loaded with a corresponding column of shell-type half bearings by simply rotating the rack 180°, retracting the clamping shoe, and placing the rack over a second loading fixture 94 containing the requisite number of bearings and loaded in a manner previously described.

The loaded plating rack can be placed on a suitable hoist or automatic conveying machine whereby the bearings thereon are conveyed through the prescribed treating sequence. The unloading of the bearings at the completion of the process cycle can simply be achieved by releasing the clamping shoes whereby the bearings are released and can be conveyed in row form to the next manufacturing step. It is also contemplated that the unloaded side of the work rack can thereafter be quickly reloaded after which the opposite side is unloaded and reloaded minimizing the number of manipulations. The light-weight and compact construction of the plating rack as herein described, enables the work rack to be readily handled manually and manipulated so as to provide for rapid and simple loading and unloading thereof.

3,282,824

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A work rack for treating the concave surfaces of workpieces comprising a framework including a pair of spaced side members and a pair of spaced end members, an electrode disposed between said side members and extending between said end members, each of said side members including a nonconductive web extending therealong and projecting inwardly toward said electrode with the opposed edges of the webs spaced substantially equally therefrom, a pair of clamping shoes mounted on one of said end members and disposed on each side of a plane through said webs and longitudinally movable relative to said one of said end members, means for independently urging each of said clamping shoes toward the opposite one of said end members for removably clamping a stacked column of workpieces therebetween, first contact means for electrifying said electrode, and second contact means for electrifying the workpieces with a charge opposite to that of said electrode.

2. A work rack for treating the concave surfaces of workpieces comprising a framework including a pair of spaced side members and a pair of spaced end members, an electrode disposed centrally between said side members and extending between said end members, each of said side members including a nonconductive web extending therealong and projecting inwardly toward said electrode in mutual diametrically opposed relationship with the opposed edges of the webs spaced substantially equally therefrom, a pair of clamping shoes mounted on one of said members and disposed on each side of a plane through said webs and longitudinally movable relative to said one of said end members, means for independently urging each of said clamping shoes toward the opposite one of said end members for removably clamping a stacked column of workpieces therebetween, engaging means on said one end member for suspending said rack from a supporting member, first contact means for electrifying said electrode, and second contact means for electrifying the workpieces with a charge opposite to that of said electrode.

3. A work rack for treating the concave surfaces of semi-cylindrical workpieces comprising a framework including a pair of spaced side members and a pair of spaced end members, an electrode disposed centrally between said side members and extending between said end members, each of said side members including a nonconductive web extending therealong and projecting inwardly toward said electrode in mutual diametrically opposed relationship with the opposed edges of the webs spaced substantially equally therefrom, a pair of clamping shoes mounted on one of said end members and disposed on each side of a plane through said webs and longitudinally movable relative to said one of said end members, resilient means for independently urging each of said clamping shoes toward the opposite one of said end members for removably clamping a stacked column of the workpieces therebetween, stop means for restricting the longitudinal movement of said clamping shoes, first contact means for electrifying said electrode, and second contact means for electrifying the workpieces with a charge opposite to that of said electrode.

4. A dual sided plating rack for electroplating the concave surfaces of semi-cylindrical workpieces comprising a framework including a pair of spaced substantially parallel side members connected at their ends to a pair of spaced end members, an anode rod disposed centrally between said side members and extending between said end members, each of said side members including a nonconductive web extending therealong and projecting inwardly toward said anode in mutual diametrically opposed relationship with the opposed edges of the webs spaced substantially equally therefrom, a pair of clamping shoes mounted on one of said end members and disposed on each side of a plane through said webs and longitudinally movable relative to said one of said end members, means for independently urging each of said clamping shoes toward the opposite one of said end members for removably clamping a stacked column of workpieces therebetween with the concave surfaces thereof positioned concentrically relative to said anode, engaging means on said one of said end members for suspending said rack from a supporting member, first contact means for electrifying said anode, and second contact means for electrifying the workpieces with a charge opposite to that of said anode.

5. An electroplating rack for plating the concave surfaces of semi-cylindrical workpieces comprising a framework including a pair of parallel spaced side members and a pair of spaced end members connected to opposite ends of said side members, an anode rod disposed centrally between said side members and extending between said end members, each of said side members including a nonconductive web extending therealong and projecting inwardly toward said anode in mutual diametrically opposed relationship with the opposed edges of the webs spaced substantially equally therefrom, a pair of nonconductive clamping shoes disposed on each side of a plane through said webs, a rod connected to each of said clamping shoes and slidably supported by one of said end members, resilient means coacting with each of the rods for independently urging each of said clamping shoes toward the opposite one of said end members for removably clamping a stacked column of the workpieces therebetween, stop means on each of said rods for restricting the longitudinal movement of said clamping shoes, an engaging member on said one end member for suspending said rack from a supporting member, first contact means for electrifying said anode, and second contact means for electrifying the workpieces with a charge opposite to that of said anode.

6. An electroplating rack for plating the concave surfaces of semi-cylindrical workpieces comprising a framework including a pair of parallel spaced side members and a pair of spaced end members connected to opposite ends of said side members, an anode rod disposed centrally between said side members and extending between said end members, each of said side members including a nonconductive web extending therealong and projecting inwardly toward said anode in mutual diametrically opposed relationship with the opposed edges of the webs spaced substantially equally therefrom, a pair of nonconductive clamping shoes disposed on each side of a plane through said webs, a rod connected to each of said clamping shoes and slidably supported by one of said end members, resilient means coacting with each of the rods for independently urging each of said clamping shoes toward the opposite one of said end members for removably clamping a stacked column of the workpieces therebetween, stop means on each of said rods for restricting the longitudinal movement of said clamping shoes, an engaging member on said one end member for suspending said rack from a supporting member, contact means mounted on said one end member and electrically insulated therefrom for contacting a bus bar, first conductor means for electrically connecting said contact means to said anode, and second conductor means for electrically connecting said engaging member to the workpieces.

7. A dual sided plating rack for electroplating the concave surfaces of semi-cylindrical bearings comprising a framework including a pair of parallel spaced side members connected at the opposite ends thereof to a pair of spaced end members, an anode rod centrally disposed between said side members and extending between said end members and electrically insulated therefrom, each of said side members including a nonconductive web extending therealong and projecting inwardly toward said anode in mutual diametrically opposed relationship with the opposed edges of the webs spaced substantially equally in parallel relationship therefrom, a pair of clamping shoes mounted on one of said end members and disposed on each side of a plane through said webs and longitudinally movable relative to said one of said end members, resilient means for independently urging each of said clamping shoes toward the opposite one of said end members for removably clamping a stacked column of bearings therebetween with the concave surfaces thereof disposed concentrically around said anode, a hook on said one end member for suspending said rack from an electrified supporting rail, a contactor mounted on said one end member and electrically insulated therefrom and adapted to electrically contact an electrified bus bar, first conductor means for electrically connecting said contactor to said anode, and second conductor means for electrically connecting said engaging hook to the workpieces on each side of said rack.

References Cited by the Examiner
UNITED STATES PATENTS

| 2,500,206 | 3/1950 | Schaefer et al. | 204—297 |
| 2,760,929 | 8/1956 | Shepard et al. | 204—297 X |

FOREIGN PATENTS

| 683,652 | 12/1952 | Great Britain. |

JOHN H. MACK, *Primary Examiner.*

D. R. JORDAN, *Assistant Examiner.*